Patented Dec. 26, 1922.

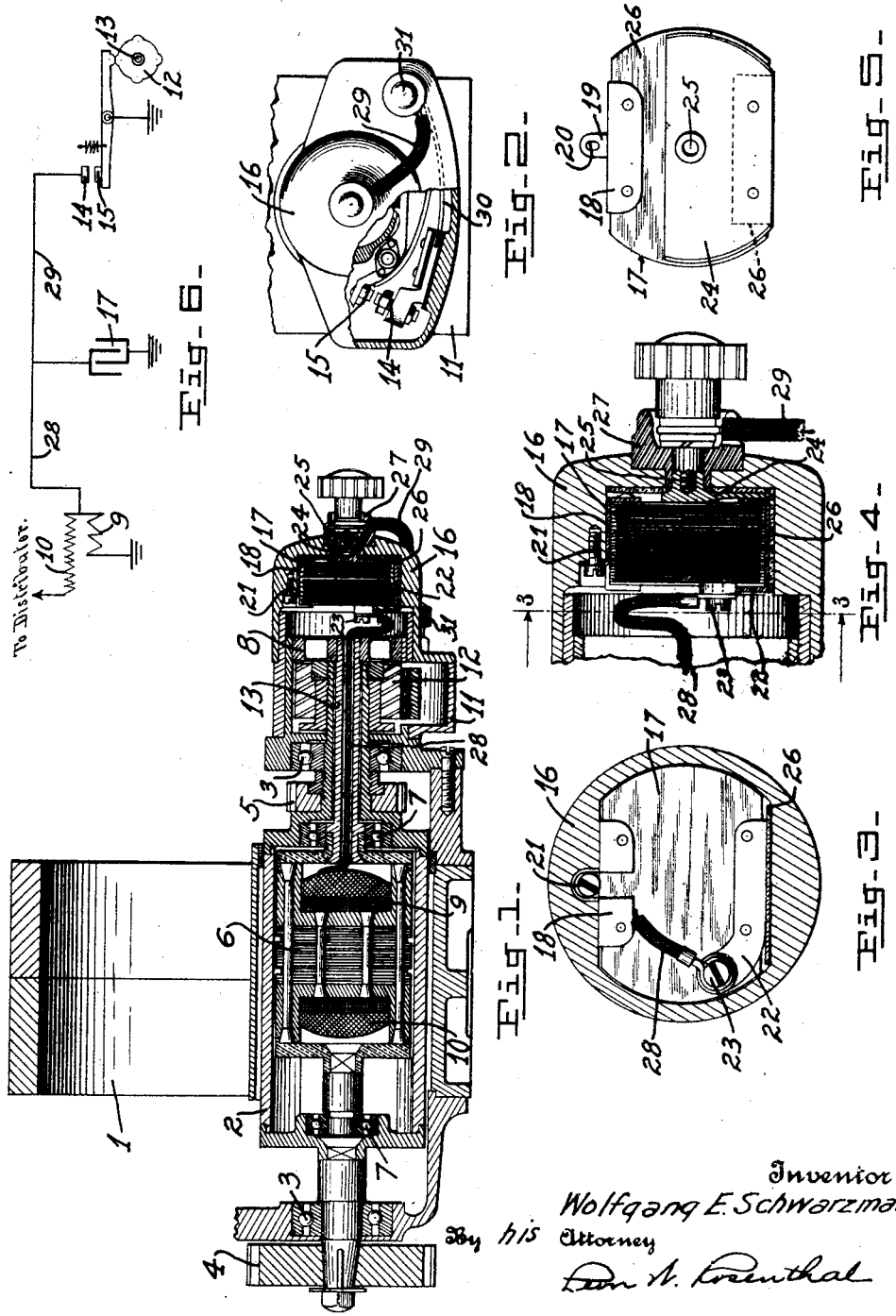

1,439,764

UNITED STATES PATENT OFFICE.

WOLFGANG ERNEST SCHWARZMANN, OF SPRINGFIELD, MASSACHUSETTS, ASSIGNOR, BY MESNE ASSIGNMENTS, TO AMERICAN BOSCH MAGNETO CORPORATION, OF NEW YORK, N. Y., A CORPORATION OF NEW YORK.

ELECTRICAL CONDENSER FOR MECHANICAL INTERRUPTERS.

Application filed October 24, 1918. Serial No. 259,581.

*To all whom it may concern:*

Be it known that I, WOLFGANG E. SCHWARZMANN, a citizen of the United States, residing at Long Meadow, Springfield, in the county of Hampden, State of Massachusetts, have invented certain new and useful Improvements in Electrical Condensers for Mechanical Interrupters; and I do hereby declare the following to be a full, clear, and exact description of the invention, such as will enable others skilled in the art to which it appertains to make and use the same.

The present invention relates to electric condensers for mechanical interrupters and particularly to condensers arranged in the cap of the interrupter.

Heretofore it has been customary in arrangements of this general kind to use the screws or other fastening devices holding the cap in place on the interrupter to make the electrical connections between the condenser and the interrupter contacts. Thus, the cap cannot be removed from place with the connections to the condenser intact for inspection. So also, connections cannot be made to the interrupter alone so that the interrupter can be used at will with a spark coil without passing through the generating winding of a magneto with which the interrupter and condenser may be associated.

In accordance with one part of my invention, the condenser in the cap has one terminal permanently grounded, preferably on the cap which may be of metal, and the other terminal detachably connected to the insulated terminal of the generating winding of a magneto or spark coil, so that when the cap is removed from place on the interrupter, the connections to the condenser, as well as the condenser itself, can be inspected.

In accordance with another part of my invention, the insulated terminal of the condenser is connected to an outside binding post on the cap, and also to the insulated terminal of the generating winding of a magneto, whereas the insulated terminal of the mechanical interrupter is connected to another outside binding post. Thus, when the two binding posts are electrically connected, the interrupter serves for the magneto, and when they are disconnected, the interrupter alone may be connected to a spark coil in a battery ignition system.

In the accompanying drawings illustrating this preferred construction in application, as an example, to a magneto wherein a plate condenser has an outside connection to a normally-stationary circuit contact of the interrupter and an inside connection to the primary winding, Fig. 1 is a longitudinal section of a sleeve type of magneto provided with the condenser of my invention; Fig. 2 is an end view of the condenser end of the magneto, partly broken away; Fig. 3 is a section on line 3—3 of Fig. 4; Fig. 4 is an enlarged cross section of the cap; Fig. 5 is a rear end view of the condenser alone; and Fig. 6 is a wiring diagram.

The magneto has the magnets 1, the sleeve 2 rotatable in the bearings 3 and carrying the magneto gear 4 and the distributor pinion 5, and the armature 6 held stationary in the bearings 7 by the locking disc 8 and carrying a generating winding comprising the primary turns 9 and the secondary turns 10. The mechanical interrupter is mounted in the housing 11 and comprises the cam 12 mounted on the shaft 13 of the rotatable sleeve, the circuit contacts, comprising the insulated contact 14 and the grounded contact 15, being normally stationary but capable of moving with the housing 11 to advance or retard the spark in the well known way.

The cap 16 is made of metal and fits snugly over a projecting flange of the housing 11 so as to close its interior and form a good electrical connection to the frame of the magneto. In the hollow interior of this cap is arranged the condenser 17 having alternate plates of foil extending outwardly of the intermediate plates of dielectric on one side of the condenser and having its other alternate plates of foil extending outside of the plates of dielectric on the other side of the condenser, in the well known way. The bent conducting plate 18 fits tightly over one end of the condenser and has a struck up clip 19 perforated at 20 for the passage therethrough of the screw 21 electrically connecting the plate, and therefore the plates of foil extending into contact with it, to the metal cap. A bent conducting plate 22 is clamped tightly around the other side of the condenser in contact with the plates of foil extending outwardly on that side, and it carries a terminal 23 and a flange riveted to a member 24 of metal into which is screwed the stud 25 of a binding post. The conducting plate 22 is insulated from the cap by the insulating material 26, and the member 24 is insulated from the cap by the insulating material 26 and the socket 27 of the binding post.

The conductor 28 extends from the insulated terminal of the primary turns of the generating winding through the hollow shaft of the sleeve to the terminal 23, forming an inside conductor between the generating winding and the insulated terminal of the condenser, the member 24 forming an inside conductor from that terminal of the condenser to the binding post. The outside conductor 29 connects the binding post with the insulated circuit contact 14 of the interrupter by way of the metal strip 30 and the binding post 31 (Fig. 2). There is sufficient slack in the conductor 28 to permit the cap to be removed from the housing 11 so that the condenser may be readily exposed for inspection, repair or replacement.

It is apparent from the foregoing description that the condenser is located in a well protected but accessible position, and, at the same time, may be removed from the interrupter by pulling off the cap, to inspect the connections to the condenser as well as the condenser itself. Furthermore, by disconnecting the conductor 29 from the binding post 31, the mechanical interrupter is entirely disconnected from the generating winding of the magneto and from the condenser, so that a spark coil may be connected to the interrupter alone for operation in a battery ignition system.

Having thus described my invention what I claim is:

1. The combination with a generating winding and a mechanical interrupter having circuit contacts, a removable cap, means for holding the cap in place, a condenser arranged in the cap and having one terminal permanently grounded and the other terminal fastened to the insulated terminal of the generating winding, whereby, when the cap is removed from the mechanical interrupter, the electrical connections to the condenser remain intact.

2. The combination with a magneto having a generating winding and a mechanical interrupter having circuit contacts, a binding post connected to the insulated circuit contact, a cap for said interrupter, a binding post on said cap, a conductor electrically connecting said binding posts, a condenser arranged within said cap, terminals on said condenser, a conductor connecting the insulated terminal of the generating winding to the insulated terminal of the condenser, the binding post of said cap being connected to said insulated terminal, and a grounded conductor connected to the other terminal of said condenser, whereby when the two binding posts are disconnected the interrupter is disconnected from the generating winding and the condenser.

3. The combination with a generator and an interrupter, a removable cap on said interrupter, a condenser in said cap, conducting plates connected to the ends of said condenser, one of said plates being connected to said cap and grounded therethrough, the other of said plates being insulated from said cap, and detachable conductors leading from said latter plate to said generator and said interrupter, the conductor leading to said generator being of sufficient length whereby when the cap and condenser are removed from the interrupter for inspection of said condenser the electrical connection of said conductors to said condenser remains intact.

4. In an electrical generator, the combination with a stationary winding and a shaft, of a mechanical interrupter and a removable cap therefor, a condenser in said cap and having a grounded terminal and an insulated terminal, a conductor connecting said winding to said insulated terminal and extending through said shaft, whereby, when said cap and condenser are moved from said interrupter, the electrical connections to said condenser remain intact.

5. In an electrical generator, the combination with a stationary winding and a shaft, of a mechanical interrupter and a removable metal cap therefor, a condenser in said cap and having one terminal permanently grounded to said cap and the other terminal insulated from said cap, an insulated conductor connecting said winding to said insulated terminal and extending through said shaft, whereby, when said cap and condenser are removed from said interrupter, the electrical connections to said condenser remain intact.

In testimony whereof I affix my signature.

WOLFGANG ERNEST SCHWARZMANN.